United States Patent Office 3,362,159
Patented Jan. 9, 1968

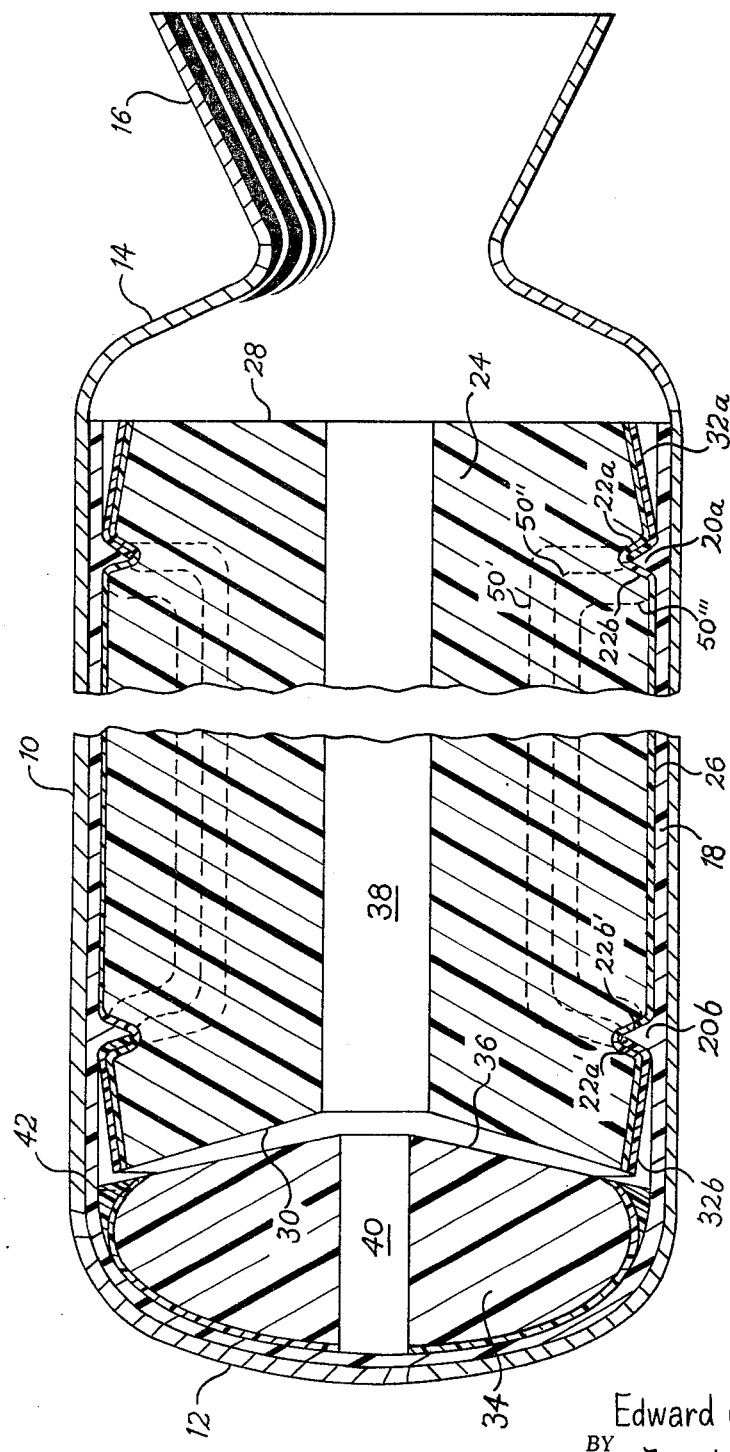

3,362,159
STRESS RELIEF ARRANGEMENT FOR SOLID PROPELLANT ROCKET MOTORS
Edward J. Heesacker, Brigham City, Utah, assignor to Thiokol Chemical Corporation, Bristol, Pa., a corporation of Delaware
Filed July 19, 1966, Ser. No. 566,329
2 Claims. (Cl. 60—39.47)

This invention relates to rocket motors and, more particularly, to means for relieving stresses that occur at the bond areas between rocket motor casings and solid propellant grains positioned therein.

As is well known to persons skilled in the art, many difficulties have been encountered in the development of adequate bonds between solid propellant grains and the motor casings in which they are held.

Although so-called "split flaps" (i.e., a band of elastomeric material bonded to the periphery of a solid propellant grain adjacent an end thereof) have heretofore been employed to allow relative movement between the ends of solid propellant grains and their casings and thus to relieve stresses that would otherwise occur at the grain-casing interface, it has been found that the bonds between split flaps and motor casings often fail, in conventional rocket motors, when the casings are pressurized by the gases of combustion of the solid propellant grains disposed therein. More particularly, the bond between a split flap and the layer of insulation which generally covers the inner surface of a solid propellant rocket motor casing is frequently broken when the casing is pressurized. When this occurs, burning of a solid propellant grain at its interface with the casing insulation produces excessive gas pressure which can cause a rocket motor to explode.

It is accordingly an object of this invention to provide means for relieving stresses that normally occur at the bond areas between rocket motor casings and solid propellant grains positioned therein.

Another object of the invention is to prevent the development of cracks at the interface between a rocket motor casing and a solid propellant grain held therein.

Still another object of the invention is to provide a bonding arrangement between a solid propellant grain and a rocket motor casing which will cause a curvature to be formed in an end burning surface (or surfaces) of said grain adjacent the wall of said casing.

A more specific object of the invention is to provide means for preventing the separation of a split flap of a solid propellant grain from the inner surface of a rocket motor casing.

These and other objects of the present invention are accomplished by providing a circumferentially-extending cusp or ridge on the inner surface of a rocket motor casing at an evenly spaced distance from the end surface of a solid propellant grain disposed within said casing, and by bonding a portion of one surface of a split flap to an inwardly-projecting surface of said cusp. With this arrangement, movement of the solid propellant grain bonded to the aforementioned split flap creates tensile stress in the bond between the split flap and the cusp formed on the inner surface of the rocket motor casing, rather than shear stress such as occurs in the longitudinally-disposed bonds between split flaps and rocket motor casings which have been employed heretofore. The bond between a split flap and the wall of a rocket motor casing is much more easily broken by a force exerted against the split flap longitudinally of the wall than it is by a force exerted normal to the wall. Thus the bonding arrangement of the invention minimizes the tendency for openings to develop in bonded areas of a grain-casing interface and protects against the excessive gas generation that results therefrom.

Furthermore, as will become apparent hereinafter, a cusp formed on the wall of a rocket motor casing in accordance with the invention also contours the end burning surfaces of a solid propellant grain, after burning has reached the cusp, so as to reduce to a minimum the stress at the grain-casing interface beyond the cusp.

In the following detailed description of a preferred embodiment of the invention, reference is made to the accompanying longitudinal sectional view of a solid propellant rocket motor in which the invention is incorporated.

Throughout the specification and the drawing like numbers designate like parts.

In the drawing is illustrated a cylindrical rocket motor casing 10 having an integral forward end closure 12 and aft end closure 14 on which is mounted a thrust nozzle 16. Bonded to the inner surface of casing 10 is a layer of insulation 18, this layer being formed with two longitudinally-spaced, circumferentially-extending cusps or ridges 20a, 20b. As illustrated in the drawing, each cusp 20a, 20b comprises two surfaces 22a, 22b, 22a', 22b' which gradually curve inwardly from the adjacent cylindrical inner surface of the layer of insulation 18 and which meet at the apex of the cusp. A first solid propellant grain 24 is disposed within casing 10 and bonded to the inner surface of the layer of insulation 18 by means of a bonding material 26 commonly referred to as "liner" in the art of solid propellant rocket motors. The end surfaces 28, 30 of grain 24 are spaced from cusps 20a, 20b respectively, and a split flap 32a, 32b is positioned around each end of grain 24. More particularly, split flap 32a extends from end surface 28 of grain 24 to the apex of cusp 20a, while split flap 32b extends from end surface 30 of said grain to the apex of cusp 20b. Each split flap is bonded at its outer surface to a respective one of the surfaces 22a, 22a' of cusps 20a, 20b, and bonded at its inner surface to the periphery of grain 24 by means of the aforementioned bonding material or liner 26. The portion of the outer surface of each split flap 32a, 32b between the cusp 20a, 20b to which it is attached and the adjacent end surface 28, 30 of grain 24 is not bonded to the layer of insulation 18, and thus the split flaps are free to move away from the inner surface of the insulation along these lengths.

A second solid propellant grain 34 is disposed within casing 10 at the head end thereof, the aft end surface 36 of this grain being spaced from the forward end surface of grain 24. Each grain 24 and 34 is formed with a perforation 38, 40 that extends between the ends thereof. In the manufacture of the rocket motor the space or slit between grains 24 and 34 is formed by positioning a removable member (not illustrated) between the grains, this removable member being held in position by an annular member 42 known as a "slot former positioner" in the art.

At the time grain 24 is cast within casing 10, the outer surfaces of split flaps 32a, 32b lie against the inner surface of the layer of insulation 18. During the cure of grain 24 or subsequent to cure of the grain when the rocket motor is stored at a low temperature, the solid propellant of the grain can contract so that the unbonded portions of the split flaps move away from the inner surface of the layer of insulation 18, for example, to the position of the split flaps illustrated in the drawing. Furthermore, forces can be exerted against the split flaps that tend to move them longitudinally of casing 10, as, for example, when the solid propellant of grain 24 expands under storage at a high temperature or when the casing is pressurized by the combustion gases of grains 24 and 34. The arrangement of the bond between the split flaps 32a and 32b and casing 10 is such that longitudinal movement of the split flaps is permitted by the stretchable insulation of the cusp which can more readily withstand movement (and the resulting strain) without cracking than can propellant. Furthermore, longitudinal movement of the ends of grain 24 causes tensile stress at the bond area between each split flap and the inwardly-projecting surface 22a, 22a' of the cusp 20a, 20b to which the split flap is attached, whereas the same movement would cause shear stresses in a bond between a split flap and rocket motor casing that is disposed longitudinally of the wall of the casing. Cusps 20a, 20b also provide the additional advantage of creating a curved surface at the portion of the end surfaces 28, 30 adjacent the inner surface of the layer of insulation 18 after the flame front reaches the cusps. This result is illustrated in the drawings by the broken lines 50', 50" and 50''', which show the curvature of the burning surface of grain 24 at different times during the operation of the rocket motor. The sloping surface of grain 24 at the grain-insulation interface after the flame front has passed cusps 20a, 20b minimizes the stresses at said interface which tend to break the bond between said grain and insulation.

It will be recognized that certain changes can be made in the embodiment of the invention which has been described without departing from the principles on which the embodiment is based. For example, in some rocket motors (such as those having casings made of metals capable of withstanding high temperatures) there may be no need for a layer of insulation 18 on the inner wall of the casings of the rocket motors. In such a rocket motor, the cusps 20a, 20b can be formed on the wall of the casing itself and the split flaps bonded to the inwardly-projecting portions of said wall. Obviously the bonding arrangement of the cusps and split flaps can be employed with any number of grains within a rocket motor casing. Thus the scope of the invention is to be understood as being limited only by the terms of the appended claims.

What is claimed is:

1. In a rocket motor comprising a casing and at least one solid propellant grain disposed within said casing, the combination comprising:
    at least one annular cusp formed on the wall of said casing and projecting inwardly from the inner surface thereof, said cusp being evenly spaced from an end surface of said grain; and
    a split flap disposed around said grain and extending from an end surface thereof to said cusp, said split flap being bonded at its outer surface to the surface of said cusp that faces the aforesaid end surface of said grain and bonded at its inner surface to the periphery of said grain, at least a portion of said split flap between said cusp and the aforesaid end surface of said grain being free to move away from the inner surface of the wall of said casing.

2. In a rocket motor comprising a substantially cylindrical casing, at least one solid propellant grain disposed within said casing, and a layer of insulation disposed between said grain and the inner surface of said casing, the combination comprising:
    at least one circumferentially-extending, inwardly-projecting cusp formed on said layer of insulation and evenly spaced from an end surface of said grain;
    a split flap disposed around said grain and extending from an end surface thereof to a point adjacent the apex of said cusp, said split flap being bonded to said layer of insulation at said cusp formed thereon and separable from the inner surface of said layer of insulation between said cusp and said end surface of said grain; and
    a layer of bonding material bonding the peripheral surface of said grain to said split flap and said layer of insulation.

No references cited.

CARLTON R. CROYLE, *Primary Examiner.*